Dec. 11, 1962  R. M. COX  3,067,979
VALVES
Original Filed Nov. 16, 1959
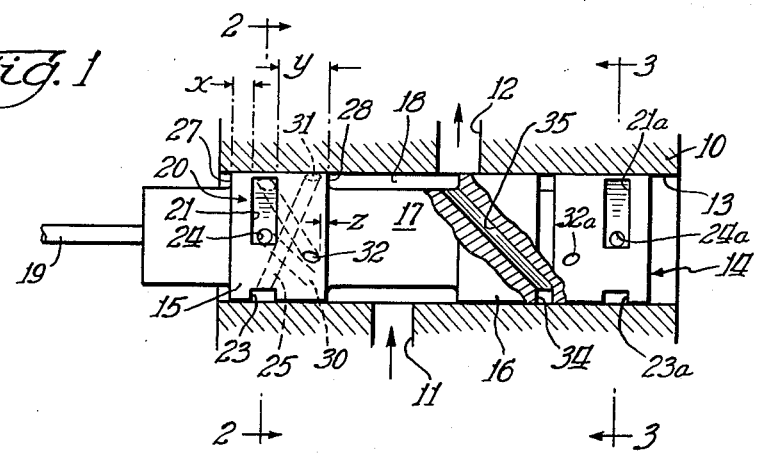
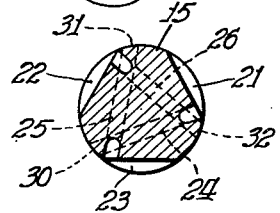
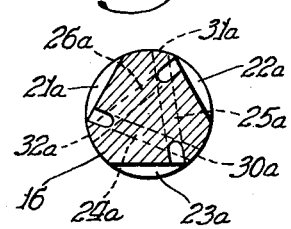
Inventor:
Robert M. Cox
By: Joseph R. Dwyer Atty

United States Patent Office 3,067,979
Patented Dec. 11, 1962

3,067,979
VALVES
Robert M. Cox, Northridge, Calif., assignor to Weston Hydraulics, Ltd., Van Nuys, Calif., a corporation of California
Continuation of application Ser. No. 853,074, dated Nov. 16, 1959. This application Dec. 15, 1961, Ser. No. 161,334
11 Claims. (Cl. 251—282)

My invention relates, in general, to valves, and in particular, to new and improved shuttle or spool type valves.

This application is a continuation of my co-pending application Serial No. 853,074 filed November 16, 1959 for "Valves."

It is a principal object of my invention to provide spool type valves with means for reducing the operating force necessary to move the spool by reducing friction and for eliminating the hazards of galling dry metal-to-metal running surfaces such as used in conventional spool type valves.

Briefly, my invention comprises a shuttle or spool valve having fluid bearing means surrounding the spool in a valve bore. This fluid bearing means is accomplished by means in the form of peripheral cavities provided in the spool lands to which fluid under pressure is directed. Means are also provided for throttling or metering the flow of this fluid to and from these cavities. This latter means comprises providing an inlet passage to each of the cavities in the valve lands, the inlet of which terminates a distance from the edges of the lands so that the fluid under pressure must travel a slight distance over the periphery of the lands before entering the inlet passage to the cavity. Similarly, the cavities themselves are each spaced a short distance from the ends of the lands so that any leakage from the cavity will be forced to travel over a portion of the land. The cavities and their respective inlet passages are also so constructed and arranged in the valve lands so that the entrance to each passage is diametrically opposite from its respective cavity so that they throttle in opposition to one another. In that manner, the pressure in the cavity is controlled by variable inlet and outlet throttling. When the clearance on the land having the inlet passage is low, the throttling of fluid is increased causing a reduced pressure in the cavity. At the same time, the clearance on the outlet passage is increased, since it is on the opposite side of the spool, causing a reduced throttling on the outlet thus further reducing the cavity pressure. This process also will increase pressure in the cavity when the side displacement of the spool is opposite to that described above.

Thus, with three or more of these cavities equally spaced around the periphery of the spool, and a side displacement produced on the spool it can be seen that the cavity on the reduced clearance side will increase pressure and the cavity on the increased clearance side will decrease pressure, thus a correcting force is produced to recenter the spool. There is a multiplying of sensitivity of the fluid bearing by the effect of the push-pull throttling of the inlet and outlet as distinguished from the conventional fluid type bearings utilizing separable cavities disconnected from one another and supplied with a constant throttle source and variable throttling on the outlet only.

My fluid bearing has an additional advantage over conventional fluid bearings in that the amount of fluid to operate the bearing is materially reduced due to the extremely small throttling area produced by a small clearance.

Accordingly, a more specific object of my invention is to provide a spool type valve with a fluid bearing means thus reducing the operating force necessary to move this spool during operation of the valve and preventing metal-to-metal contact of the parts.

Still another and more particular object of my invention is to provide a spool type valve with cavities spaced about the perimeter of the lands of the spool valve and in communication with the fluid under pressure within the valve whereby this fluid forms a fluid bearing between the spool and the valve housing and the spool itself meters the fluid utilized to form the fluid bearing thus increasing the sensitivity of such bearings.

Other objects, advantages and novel features of my invention will become apparent upon consideration of detailed discussion taken in conjunction with the accompanying drawings wherein:

FIG. 1 is an elevational cross sectional view partially broken away, illustrating to advantage a spool type valve constructed in accordance with the teachings of my invention;

FIG. 2 is a cross sectional view taken along line 22 of FIG. 1 looking in the direction of the arrows and illustrating to advantage the means in one of the lands which creates the fluid bearing means of my invention; and FIG. 3 is a cross sectional view taken along line 33 of FIG. 1 looking in the direction of the arrows illustrating the fluid bearing means in the other land of the valve illustrated in FIG. 1.

Referring now to the drawings, it can be seen that a valve housing or sleeve 10 is provided with an inlet port 11 and an outlet port 12 opening into a cylindrical valve bore 13. A spool, indicated in its entirety as 14, slidable in the valve bore 13, is provided with a pair of lands 15 and 16 spaced apart and connected by a central reduced spool portion 17. Lands 15 and 16 define a valve chamber 18 therebetween which is in open communication with the valve inlet port 11 and one of the lands is so arranged that axial slidable movement of the spool by any suitable means attached to rod 19 will serve to meter the flow of fluid out of the outlet 12.

Valve land 15 is provided with a plurality of cavities (three shown and indicated in their entirety as 20) disposed about the periphery thereof. These three cavities, 21, 22 and 23 open outwardly and form chambers with the bore 13 and are each respectively indirectly connected to the fluid pressure chamber 18 by diagonally disposed bores or conduits 24, 25 and 26. It is to be noted that each of these cavities, 21, 22, and 23 is spaced a distance, such as $x$, from the outer end or peripheral edge 27 of the land 15 and is spaced a distance, such as $y$, from the inner end of peripheral edge 28 of the land 15. The cavities are also disposed at equi-angular distances from one another about the periphery of the land, as more clearly shown in FIG. 2, and are disconnected from one another so that each of the cavities is independently in communication with their respective passages 24, 25 and 26. Passages 24, 25 and 26 terminate inwardly at terminal openings 30, 31 and 32 respectively, a slight distance, such as $z$, of the inner end 28 of the land 15, so that fluid under pressure from the pressure supply in the chamber 18 must travel a slight distance $z$ over the land before it enters the passage. In like manner, any fluid that would tend to leak from any one of the cavities must also travel a distance $x$ before it reaches the end of the spool 27. The traveling of fluid the distance $z$ prior to its entry of the respective passages and the distance $x$ that the fluid must travel upon leaving the respective cavities toward the ends of the spool forms a means of throttling the flow both in and out of the passages and cavities. In a sense, the distances $z$ and $x$ are variable continuation of passages 24, 25 and 26 utilized to throttle flow to and from the cavities.

In this invention, it is to be noted that each of the cavities 21, 22 and 23 is supplied with fluid pressure from a passage having its inlet diagonally opposite thereto as is shown at 30, 31 and 32 in FIGURE 2. As more clearly illustrated in FIGURE 1, if the clearance between the top of the bore 13 and the top of the land 15 is increased and the clearance at the bottom decreased, more flow into the inlet 31 from the chamber 18, and reduced flow from the cavity 23 over the distance x to outlet i.e. the end 27 of the spool will produce a higher pressure in cavity 23. Similarly, if the clearance between the top of the bore 13 and the top of the land 15 is decreased and the clearance at the bottom increased, less flow into the inlet 31 from the chamber 18, and more flow from cavity 23 over the distance x to outlet i.e. the end 27 of the spool, will produce a lower pressure in cavity 23. Thus, by reason of the inlet to each of the passages being located diagonally opposite from its respective cavity, and the outlet being on the same side as the cavity the control of flow has a push-pull effect on the pressure. This push-pull effect results in a double gain in sensitivity of the bearing which is considerably increased over that in conventional fluid bearings.

In one embodiment of this invention where air is used to provide the fluid bearing, a spool, such as 14, which is lap fitted into a bore, such as 13, with a clearance of 0.0001 to 0.00005, forms a means of metering and floating the spool in actual practice.

While I have disclosed the cavities and throttling means in connection with one land 15, it can be seen that the other land 16 is also provided with means defining a similar fluid bearing arrangement. However, by reason of the location of the outlet 12 with respect to the chamber 18 a peripheral groove 34 is provided in open communication with the chamber 18 by a passage 35 extending diagonally on the spool. This groove 34 provides a source of pressure fluid for the cavities of the same pressure value as that in chamber 18 and by-passes the outlet 12 to prevent any interference in the normal function of the spool.

By reason of the fact that the cavities and passages in land 16 are identical with the passages and cavities forming the bearing means in the land 15 and function identically I have utilized similar reference numerals to indicate such like parts except for the suffix "a."

From the above description it can be seen that I have provided a shuttle valve with a fluid bearing means which literally floats the spool or shuttle within the valve bore. This bearing means by reason of being supplied with supply pressure from the fluid which is regulated by the spool and by reason of the throttling to and from of the cavities forming the air bearing utilizing the clearance between the spool and the bore provides a greater sensitivity or force gain than conventional types of bearings. In this matter too, the amount of fluid required to operate this air bearing is measurably reduced. Furthermore, while I have mentioned the practical embodiment of my invention as being an air bearing, any incompressible or compressible fluid may be used. Furthermore, it is apparent that this invention may be utilized where extremely hot gasses are used since the air bearing literally floats the shuttle within the valve bore preventing running contact between metals and utilizes the fluid being regulated as its bearing means.

While I have described my invention in connection with one specific embodiment thereof, it is to be understood that is by way of illustration and not by way of limitation and that the scope of my invention is defined solely by the appended claims which should be construed as broadly as the prior art will permit.

I claim:

1. In a valve comprising a valve housing with a bore therein; means defining a valve spool having spaced lands thereon and defining with said bore a chamber for fluid under pressure, an inlet to and an outlet from said chamber, said valve spool being adapted to move to meter the flow of fluid from said chamber out said outlet; and means to reduce the force necessary to move said spool comprising cavity means in the peripheries of said lands, and means communicating fluid under pressure from said chamber over portions of said lands and thence through the interior of said spool to enter said cavity means so that said fluid so communicated defines a fluid bearing means about the peripheries of said lands, said communicating means connecting said cavity means with fluid pressure from an opposite side of the land.

2. In a valve comprising a valve housing with a bore thterein; means defining a valve spool having spaced lands thereon and defining with said bore a chamber for fluid under pressure; an inlet to and an outlet from said chamber, said valve spool being adapted to move to meter the flow of fluid from said chamber out said outlet; and means to reduce the force necessary to move said spool comprising cavity means in the peripheries of said lands, and means communicating fluid under pressure from said chamber over portions of said lands and thence through the interior of said spool to enter said cavity means so that said fluid so communicated defines a fluid bearing means about the peripheries of said lands, said communicating means connecting said cavity means with fluid pressure from an opposite side of the land.

3. In a valve comprising a valve housing with a bore therein; means defining a valve spool having spaced lands thereon and defining with said bore a chamber for fluid under pressure; an inlet to and an outlet from said chamber, said valve spool being adapted to move to meter the flow of fluid from said chamber out said outlet; and means to reduce the force necessary to move said spool comprising means defining a plurality of cavities in the periphery of each of said lands, said cavities being disconnected from one another, and means communicating fluid under pressure from said chamber over portions of said lands and thence through the interior of said spool to enter said cavities so that said fluid so communicated defines a fluid bearing means about the peripheries of said lands, said communicating means connecting each of said cavities with fluid pressure from an opposite side of said land.

4. In a valve comprising a valve housing with a bore therein; means defining a valve spool having spaced lands thereon and defining with said bore a chamber for fluid under pressure; an inlet to and an outlet from said chamber, said valve spool being adapted to move to meter the flow of fluid from said chamber out said outlet; and means to reduce the force necessary to move said spool comprising means defining a plurality of cavities in the peripheries of said lands, said cavities being disconnected from one another, and means communiting fluid under pressure from said chamber over portions of said lands and thence through the interior of said spool to enter said cavities so that said fluid so communicated defines a fluid bearing means about the peripheries of said lands, said communicating means connecting each said cavity with fluid pressure from an opposite side of the land.

5. In a valve comprising a valve housing with a bore therein; means defining a movable valve spool having at least one land and a chamber for fluid under pressure; and means to reduce the force necessary to move said spool comprising a plurality of cavities in said land spaced about the periphery of said land and spaced from the edges thereof, said cavities opening toward the walls of said bore, and means communicating fluid under pressure from said chamber over the periphery of said land and thence through the interior of said spool to enter said cavities so that said fluid so communicated is throttled and reacts against said bore to define a fluid bearing means about the periphery of said land, said communicating means connecting each said cavity with fluid pressure from an opposite side of the land.

6. In a valve comprising a valve housing with a bore therein; means defining a movable valve spool having at least one land and a chamber for fluid under pressure; and means to reduce the force necessary to move said spool comprising a plurality of cavities in said land spaced from the periphery of said land and from the edges thereof, said cavities opening the walls of said bore, and means comprising passages formed in said spool communicating with each said cavity and terminating at the periphery of said land spaced from the edges of said land and diagonally opposite from its respective cavity for communicating fluid under pressure from said chamber over the periphery of said land and thence through the interior of said spool to enter said cavities so that said fluid so communicated is throttled and reacts against said bore to define a fluid bearing means about the periphery of said land.

7. A valve, comprising: a valve housing having an inlet and outlet; a valve body movable in said housing to meter fluid flow through said outlet, said body having at least one land with a continuous wall in close fitting relation with said housing for movement therealong; and means to reduce the force necessary to move said valve body comprising walls on said body defining a plurality of independent conduits each extending through the interior thereof to communicate opposite sides of said continuous wall, one peripheral edge of said continuous wall, being subject to fluid pressure that is to be metered through said outlet to permit said fluid to squeeze between said continuous wall and the housing and thereby act as a fluid bearing, said valve body upon being displaced laterally from a center position relative to the housing affecting the clearance between the housing and opposite sides of said continuous wall to throttle fluid through at least one conduit resulting in differential pressures at the terminals of said one conduit to provide forces urging said valve body back to center position.

8. A valve, comprising: a valve housing with a circular cylindrical bore and provided with an inlet and an outlet; a valve spool having spaced cylindrical lands slidable in said bore to meter flow from said outlet and defining between the lands with said housing a chamber for fluid under pressure, said lands being in close fitting relation with the walls of said bore with a clearance therebetween approximately .0001 of an inch, and means to reduce the force necessary to axially reciprocate said valve body comprising walls on the body defining a plurality of independent conduits each extending through the interior thereof to communicate opposite sides of at least one land, each said conduit having terminal openings axially spaced about and spaced from the peripheral edges of the land, said one land having its edge closest to said chamber subject to fluid at all times so as to permit slight fluid to leak past said one land and thereby act as a fluid bearing, said valve body upon being laterally displaced from a center position concentric with said bore causing said clearance to be affected as to certain opposite sides of the body thereby throttling fluid pressure through at least one conduit and resulting in differential pressure at the terminal openings of said one conduit to provide push-pull forces urging said valve body back to center position.

9. A valve, comprising: a valve housing having an inlet and an outlet, a valve body movable in said housing to meter fluid flow through said outlet, said body having at least one land with a continuous wall in close fitting relationship with said housing for movement therealong; and means to reduce the force necessary to move said valve body comprising walls on said land defining a plurality of cavities equally spaced circumferentially about the continuous wall, said cavities being aligned in a plane normal to the axis of said valve body, and walls on the body defining a plurality of independent conduits each extending through the interior of the valve body to communicate one cavity with an opposite side of said continuous wall, each of said conduits having terminal openings axially spaced about and spaced from the peripheral edges of said continuous wall, each said cavities being dimensionally wider than the mouth of its connected conduit and much greater in depth than the clearance between said housing and continuous wall, the inner periphery of said continuous wall being subject to fluid pressure in said housing so as to permit slight fluid to pass between said continuous wall and the housing and thereby act as a fluid bearing, said valve body upon being displaced laterally from center position relative to the housing affecting the clearance between the housing and opposite sides of said continuous wall to throttle fluid pressure through at least one conduit resulting in differential pressure at the terminal openings of said one conduit to provide forces urging said valve body back to center position.

10. A valve as in claim 9, in which said cavities each have a flat base formed as a chord of the valve body cross-section and side walls extending perpendicular to the valve body axis.

11. In a valve comprising a valve housing with a bore therein; a movable valve spool having at least one land; means defining a chamber for fluid under pressure; and means to reduce the force necessary to move said spool comprising a plurality of cavities in said land spaced about the periphery of said land and spaced from the edges thereof, said cavities opening toward the walls of said bore, and means communicating fluid under pressure over the periphery of said land and thence through the interior of said spool to enter said cavities so that said fluid so communicated is throttled and reacts against said bore to define a fluid bearing means about the periphery of said land, said communicating means connecting each said cavity with fluid pressure from an opposite side of the land.

No references cited.